United States Patent [19]

Vinokurov

[11] Patent Number: 4,970,876

[45] Date of Patent: Nov. 20, 1990

[54] EVAPORATIVE COOLER

[75] Inventor: Lev Vinokurov, Rishon Lezion, Israel

[73] Assignee: Barak-Concord, Haifa, Israel

[21] Appl. No.: 208,588

[22] Filed: Jun. 20, 1988

[30] Foreign Application Priority Data

Mar. 22, 1988 [IL] Israel ........................................ 85817

[51] Int. Cl.⁵ .............................................. F28D 5/00
[52] U.S. Cl. ..................................... 62/304; 98/105;
98/109; 261/107
[58] Field of Search .......................... 62/304, 309, 310;
98/109, 30, 105; 261/29, 107, 112.2, 94, 95, 100,
104

[56] References Cited

U.S. PATENT DOCUMENTS

| | | |
|---|---|---|
| 373,858 | 11/1887 | Schulenburg . |
| 432,837 | 7/1890 | Renalds . |
| 1,262,068 | 4/1918 | Lindberg . |
| 1,991,581 | 1/1933 | Shelor .................................. 261/107 |
| 2,048,694 | 7/1936 | Harris ..................................... 257/9 |
| 2,104,209 | 1/1938 | Pierson .................................. 261/107 |
| 2,138,709 | 11/1938 | Rainbolt ................................. 98/105 |
| 2,164,763 | 7/1939 | Buck ...................................... 261/107 |
| 2,187,019 | 1/1940 | DeMund et al. ..................... 261/30 |
| 2,342,841 | 2/1944 | Carraway ............................... 236/44 |
| 2,396,024 | 3/1946 | Seaman ................................. 261/30 |
| 2,464,766 | 3/1949 | Pennington ........................... 62/139 |
| 2,914,308 | 11/1959 | Bock ...................................... 62/304 |
| 3,065,956 | 11/1962 | Meek ..................................... 261/29 |
| 3,362,186 | 1/1968 | Patterson ......................... 62/304 X |
| 4,226,174 | 10/1980 | Vesper .................................. 98/109 |
| 4,231,975 | 11/1980 | Peltier .................................. 261/99 |
| 4,307,656 | 12/1981 | Vesper .................................. 98/109 |
| 4,312,819 | 1/1982 | Leyland ............................... 261/152 |
| 4,362,090 | 12/1982 | Whiteley .............................. 98/33 a |
| 4,379,712 | 4/1983 | Sperr, Jr., et al. ............... 55/257 R |
| 4,429,735 | 2/1984 | Nomaguchi et al. ............. 62/304 X |
| 4,523,630 | 6/1985 | Wiklund .............................. 165/18 |
| 4,706,552 | 11/1987 | Maguire ................................. 98/30 |

Primary Examiner—Henry A. Bennet
Attorney, Agent, or Firm—Fulwider, Patton, Reiber, Lee & Utecht

[57] ABSTRACT

Cooling apparatus comprising an air humidifying element defining a plurality of liquid pathways and a plurality of parallel air pathways intersecting and communicating with the plurality of liquid pathways and apparatus for applying a pressure gradient across the plurality of parallel air pathways and, in another embodiment, air conditioning apparatus comprising a housing defining an inlet and an outlet, apparatus located within the housing for providing passage of air between the inlet and the outlet, apparatus located within the housing, upstream of the outlet, for cooling air passed between the inlet and the outlet and apparatus located within the housing for raising the relative humidity of the air passed between the inlet and the outlet, the apparatus for raising the relative humidity comprising an air humidifying element defining a plurality of liquid pathways and a plurality of parallel air pathways intersecting and communicating with the plurality of liquid pathways.

22 Claims, 6 Drawing Sheets

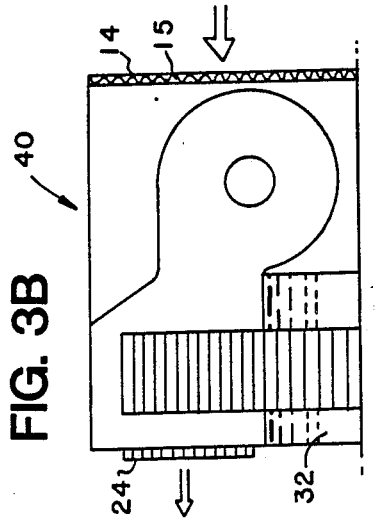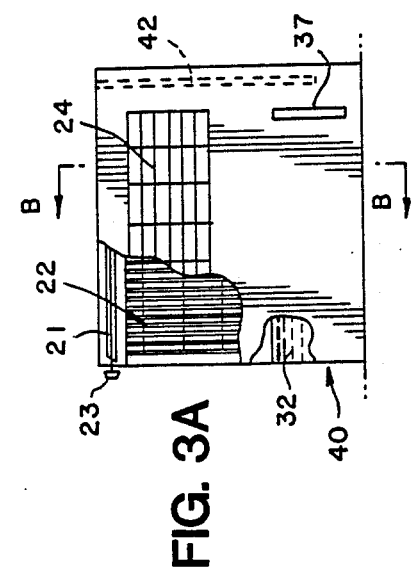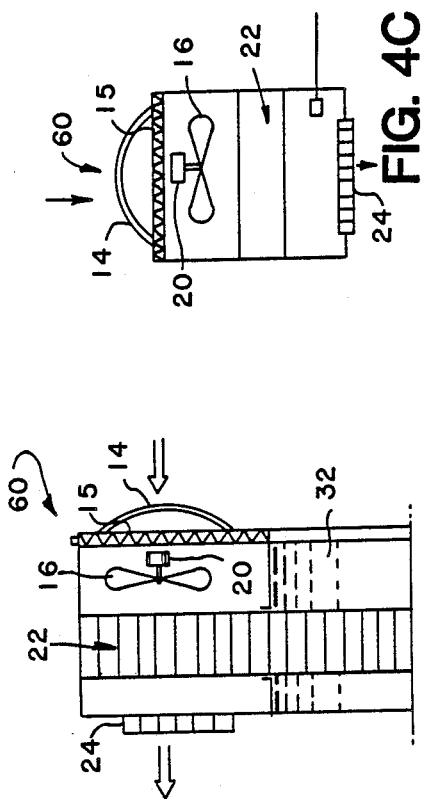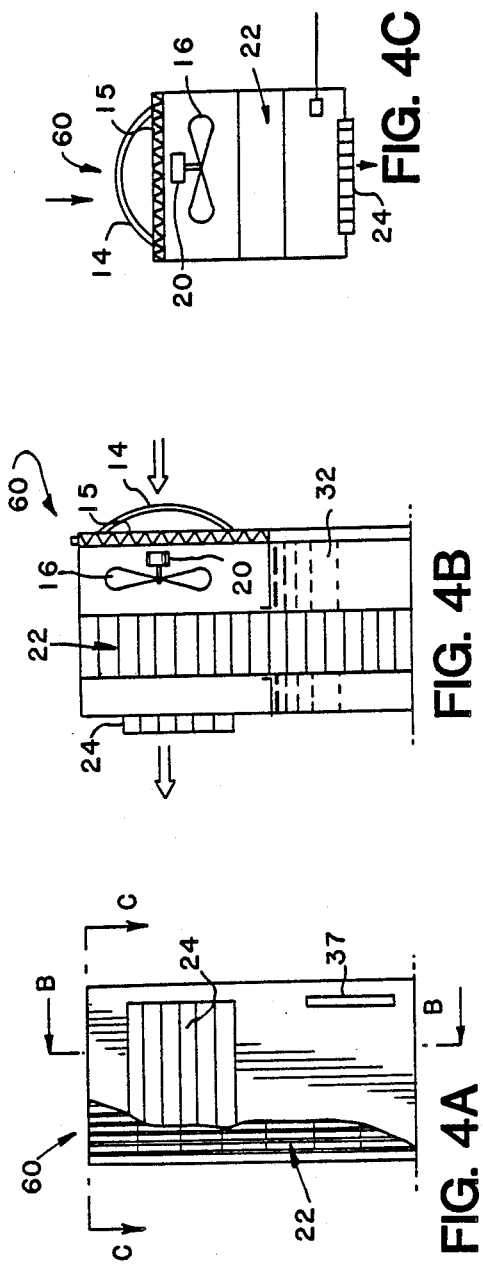

EVAPORATIVE COOLER

FIELD OF THE INVENTION

The present invention relates in general to environmental cooling apparatus and in particular to evaporative coolers.

BACKGROUND OF THE INVENTION

Systems for cooling or otherwise controlling the environment are well known. In particular, air conditioners are widely used and operate by drawing in hot air and expelling, into a closed environment, cool dry air.

A disadvantage of air conditioners is that although they effectively cool the air in a closed environment to a comfortable temperature, they also substantially reduce the moisture content of the air and, as a result, persons exposed to the relatively dry air may suffer from sore throats, headaches and related conditions. Furthermore, air conditioners are generally expensive to manufacture and run.

Distinct from air conditioners are evaporative coolers, which are most effective in hot, dry climates. Evaporative coolers, also known as desert coolers, are operative to draw in dry air, to raise significantly its moisture content and to resupply the moist air into the environment. As the air is drawn into the cooler its moisture content is raised and its temperature falls.

Disclosed in U.S. Pats. Nos. 2,187,019 and 2,396,024, are two kinds of evaporative air cooler, both of which include an air blower that is operative to draw air through a water absorbent pad and to expel moist, cooled air into the environment.

Further disclosed, in U.S. Pat. No. 4,231,975 is an evaporative cooler and a water absorbent pad therefor. The pad consists of loosely packed, randomly oriented fibers coated with a thin layer of Portland cement that is water absorbent and that has a granular surface.

The U.S. Patents referred to above disclose coolers in which a blower is provided downstream of the water absorbent pad or in the 'wet zone'. The blower is, therefore, exposed to very moist air, together with various maintenance problems that may be caused thereby.

U.S. Pat. No. 2,164,763 relates to a portable air conditioner in which a fan blows air from a dry zone across cloths that are partly submerged in a water tank.

Disclosed in U.S. Pat. No. 2,104,209 is an air conditioner in which a fan blows air through a screen of wick material which is partially immersed in water, water being drawn into the screen by capillary action. The air follows a circuitous route through a baffle configuration.

U.S. Pat. No. 1,991,581 discloses apparatus in which air is drawn through a fabric partially immersed in water.

Disclosed in U.S. Pat. No. 2,464,766 is air conditioning apparatus having a circular evaporative pad which is rotated through a trough of water. The evaporative pad comprises aluminum and wool.

Each of the absorbent pads, wicks or cloths disclosed in the above-referenced U.S. Patents constitutes a medium that is highly water absorbent but from which it is difficult to remove water by application of a pressure gradient thereacross, such as by an air blower. Consequently, a relatively strong air current is required to be provided across the absorbent pads in order for the water retained thereby to be released into the atmosphere.

U.S. Pat. No. 2,342,842 relates to an air conditioning and cooling system including a thermostat and operative to cool air by means of a water spray, the air passing through a filter. This cooling system, it will be appreciated, is inherently wasteful of water.

Available on the market is an air conditioning system intended for use in a computer room. In addition to the need to dissipate heat produced by computers, there is also a need to humidify the environment of a computer room. Marketed by The Hiross Group of, inter alia, the U.S.A. and the U.K. is an air conditioner for computer rooms called MINIOVER. This product includes a cooling element through which air is passed and cooled, there also being provided a heating element for supplying steam to the cooled on exiting the air conditioner. A disadvantage of this product is its use of a heating element, which consumes energy at a relatively high rate.

SUMMARY OF THE INVENTION

It is an aim of the present invention to provide highly efficient cooling apparatus which overcomes disadvantages of the prior art.

There is provided, therefore, in accordance with an embodiment of the invention, cooling apparatus comprising an air humidifying element defining a plurality of liquid pathways and a plurality of parallel air pathways intersecting and communicating with the plurality of liquid pathways and apparatus for applying a pressure gradient across the plurality of parallel air pathways.

Additionally in accordance with an embodiment of the invention, the air humidifying element comprises a plurality of substantially parallel, liquid absorbent plates, the plurality of parallel air pathways being defined therebetween.

Further in accordance with an embodiment of the invention, the width of each of the plurality of air pathways is defined by spacer members aligned parallel to a direction of air flow.

Additionally in accordance with an embodiment of the invention, the plurality of plates are spaced close together such that the velocity of air entering the plurality of pathways is increased and such that the air pressure therealong is decreased.

Further in accordance with an embodiment of the invention, the apparatus for applying a pressure gradient comprises air transport apparatus defining an inlet and an outlet.

Additionally in accordance with an embodiment of the invention, the air humidifying element is situated downstream of the air transport apparatus.

Further in accordance with an embodiment of the invention, there is also provided apparatus for supplying a liquid to the air humidifying element.

Additionally in accordance with an embodiment of the invention, the apparatus for supplying a liquid comprises a liquid reservoir and the air humidifying element is partially immersed in the liquid.

Further in accordance with an embodiment of the invention, the liquid is water.

Additionally in accordance with an embodiment of the invention, the cooling apparatus also includes a housing having one or more outlet ports for cool, relatively humid air.

Further in accordance with an embodiment of the invention, there is also provided regulating apparatus for lowering the relative humidity and for raising the temperature of air passing through the one or more outlet ports.

Additionally in accordance with an embodiment of the invention, the regulating apparatus comprises apparatus for supplying ambient air from the inlet directly to the one or more outlets so as to bypass the air humidifying element.

In accordance with one embodiment of the invention, the air transport apparatus and the air humidifying element are located remotely from each other, there being provided a conduit for passing air between the outlet of the air transport apparatus and the moist element.

In accordance with an alternative embodiment of the invention, the cooling apparatus is mounted onto a vehicle and the outlet ports are associated with the interior of the vehicle.

In accordance with yet a further embodiment of the invention, there is provided, in association with the housing outlet ports, apparatus associated with the one or more outlets for supplying negative ions to the air.

In accordance with an additional embodiment of the invention, there are provided a plurality of the air humidifying elements and there are also provided a plurality of the reservoirs, each of the air humidifying elements being immersed in one of the reservoirs.

In accordance with yet a further embodiment of the invention, there are provided a plurality of the reservoirs, the air humidifying element passing through some of the reservoirs so as to be in liquid absorbing contact with the liquid contained therein.

There is provided, according to an alternative embodiment of the invention, air conditioning apparatus comprising a housing defining an inlet and an outlet; apparatus located within the housing for providing passage of air between the inlet and the outlet; apparatus located within the housing, upstream of the outlet, for cooling air passed between the inlet and the outlet; and apparatus located within the housing for raising the relative humidity of the air passed between the inlet and the outlet.

Additionally in accordance with an embodiment of the invention, the apparatus for raising the relative humidity comprises an air humidifying element defining a plurality of liquid pathways and a plurality of parallel air pathways intersecting and communicating with the plurality of liquid pathways.

Further in accordance with an embodiment of the invention, there is also provided apparatus for supplying water to the air humidifying element.

Additionally in accordance with an embodiment of the invention, the apparatus for supplying water comprises a water reservoir and the air humidifying element is formed of a water absorbent material and is partially immersed in the water.

Further in accordance with an embodiment of the invention, the apparatus for cooling air passed between the inlet and the outlet comprises apparatus for evaporating a liquefied gas, the water reservoir being partly supplied by condensed water formed on the apparatus for evaporating.

Additionally in accordance with an embodiment of the invention, the air humidifying element is situated upstream of the apparatus for evaporating.

In accordance with an alternative embodiment of the invention, the air humidifying element is situated downstream of the apparatus for evaporating.

In accordance with a further alternative embodiment of the invention, there are provided a plurality of the air humidifying elements and there are also provided a plurality of the reservoirs, each of the air humidifying elements being immersed in one of the reservoirs.

In accordance with yet a further alternative of the invention, there are provided a plurality of the reservoirs, the air humidifying element passing through some of the reservoirs so as to be in water absorbing contact with the water contained therein.

BRIEF DESCRIPTION OF THE DRAWINGS

The present invention will be understood and appreciated more fully from the following detailed description taken in conjunction with the drawings, in which:

FIG. 3A is a partially cut-away front elevation of an evaporative cooler, constructed in accordance with an alternative embodiment of the invention;

FIG. 3B is a sectional view of the cooler of FIG. 3A, taken along line B—B therein;

FIG. 4A is a partially cut-away front elevation of an evaporative cooler, constructed in accordance with a further embodiment of the invention;

FIG. 4B is a sectional view of the cooler of FIG. 4A, taken along line B—B therein;

FIG. 4C is a sectional view of the cooler of FIG. 4A, taken along line C—C therein;

DETAILED DESCRIPTION OF THE INVENTION

Figure 1:
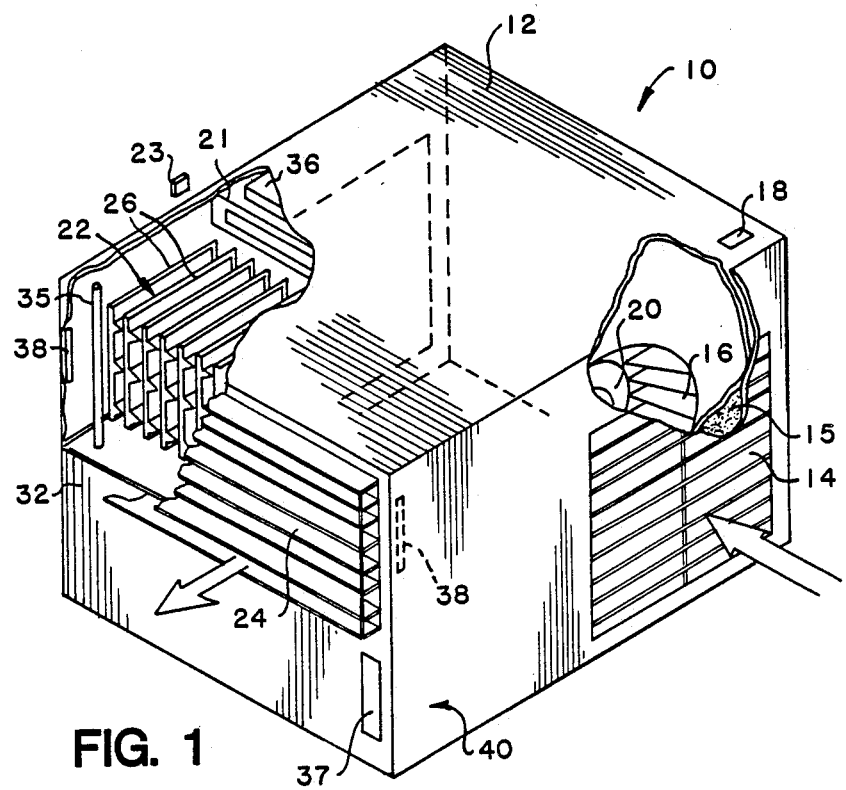
FIG. 1 is a partially cut-away perspective illustration of an evaporative cooler, constructed and operative in accordance with a preferred embodiment of the present invention.

With reference to FIG. 1, there is shown an evaporative cooler, referenced generally 10, constructed and operative in accordance with a preferred embodiment of the present invention.

Cooler 10 comprises a housing 12 which defines an air inlet 14 with which is associated air transport apparatus 16, preferably a blower, which is operated by means of a switch 18 associated with a motor 20.

Blower 16 is operative to draw air into the cooler through inlet 14 and through a filter 15 associated therewith and passes the air through a humidifying element 22, the air exiting cooler 10 through outlet grill 24. It is appreciated that cooler 10 is intended for use primarily in hot, dry environments, and is operative to raise the moisture content of the air drawn in through inlet 14 by passing the air across humidifying element 22. As the moist air passes through element 22, the increased humidity of the air causes it to be cooled and it thus exits outlet grill 24 as cool, relatively humid air.

It is appreciated that although the air passed through cooling unit 10 and being supplied thereby is cool, the high relative humidity thereof may be felt by a person in the vicinity thereof to be excessive. There is thus provided a regulator 21 which, by turning of a handle 23, is operative to permit hot, dry air drawn in to the cooling unit to be supplied directly to outlet 24, bypassing element 22. The relative humidity of the air exiting outlet 24 is, therefore, lowered to an acceptable level although the temperature of the air is raised slightly.

Figure 2:
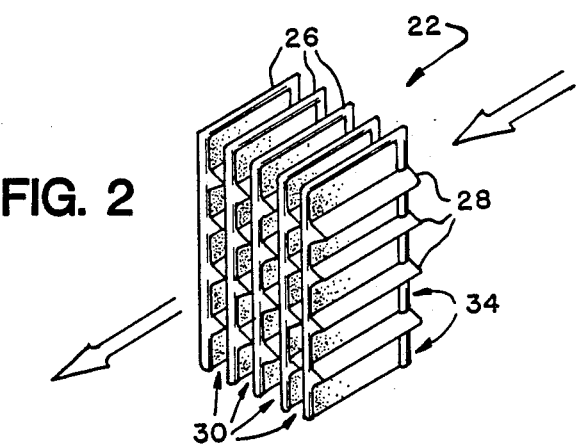
FIG. 2 is an illustration of a humidifying element useful in the cooler of FIG. 1.

With additional reference to FIG. 2, humidifying element 2i comprises a plurality of parallel plates 26 which have formed thereon a plurality of parallel ridges 28 which function as spacers between the plates. Plates 26 are formed of a rigid, water absorbent material. Although any suitable product may be used for plates 26, a typical product is an all glass fiber battery separator marketed under the trade name 10-G and manufactured by Evanite Battery Separator, Inc., P.O. Box E, Corvallis, OR 97339, U.S.A.. When element 22 is placed in a water reservoir 32, as shown in FIG. 1, the plates tend to draw water upward and constitute, therefore, water passageways, referenced 30.

Air passageways, referenced 34, are defined between plates 26, and intersect and communicate with water passageways 30. As air is blown across element 22 by blower 16, it is conducted along passageways 34 and causes partial evaporation of water from plates 26, the relative humidity of the air passing therethrough thus becoming very high, a typical value being 95%.

Plates 26 are spaced relatively close together. The greater the constriction, which is constituted by air passageways 34, the greater the velocity of air passing therealong and the greater the drop in air pressure. This is the well known Bernoulli effect. The increase in the velocity of the air flow and the resultant decrease in the air pressure causes an increase in the rate of evaporation of moisture from plates 26 into the air flow and a corresponding increase in the rate at which water is drawn up into the plates.

It will be appreciated that the ease of the air passage across element 22 is in stark contrast to the more difficult air passage of air through moist fiber pads such as conventionally used. Accordingly, it has been found that to achieve a given amount of cooling, substantially less energy is consumed by the cooler of the present invention than conventional coolers using moist fiber pads.

In accordance with a preferred embodiment of the invention, blower 16 is placed upstream of humidifying element 22 in the 'dry' zone. This is in contrast with conventional coolers, wherein the blower is placed downstream of the humidifying element in the 'wet' zone. Being located in the dry zone, blower 16 is, therefore, not subject to problems that might otherwise be caused by working in the very moist conditions of the wet zone.

Water reservoir 32 includes a water inlet 35 and there is also provided a water-level gauge, referenced 37.

According to the shown embodiment, there is also provided apparatus, indicated schematically at 36, for imparting negative ions to air passing through cooler 10. The imparting of negative ions to an environment has been found to be therapeutically beneficial to persons in that environment.

Electrodes, referenced 38, associated with apparatus 36 are provided downstream of element 22. It will be appreciated that due to the very high humidity of the air passing through element 22, the dielectric constant of the air is high relative to that of dry air and that the required energy input may, therefore, be smaller than may otherwise be required.

Reference is made briefly to FIGS. 3A and 3B, in which there is shown an evaporative cooler, referenced generally 40, constructed in accordance with an alternative embodiment of the invention.

Cooler 40 is generally similar to cooler 10 shown in FIG. 1. Similar components are, therefore, denoted by similar reference numerals and are not specifically described hereinbelow.

Cooler 40 is intended for permanent mounting onto a wall or any other suitable fixed surface. According to the shown embodiment, there is provided a water inlet conduit, referenced 42, by which the unit may be connected to a water supply (not shown).

It will be appreciated by persons skilled in the art, that blower 16 (FIG. 1) need not necessarily be located within housing 12 (FIG. 1). According to an alternative embodiment of the invention, blower 16 is located in an independent housing remote from housing 12 and communicates with housing 12 by way of a conduit (not shown).

According to yet a further embodiment of the invention, although a single outlet 24 is shown, cooler 40 may constitute a central cooling system for a building, such as a house or an office building, and there may be provided a plurality of similar outlets in each room of the building, a single humidifying element 22 being provided centrally or a single element being provided at each outlet.

Figure 3D:
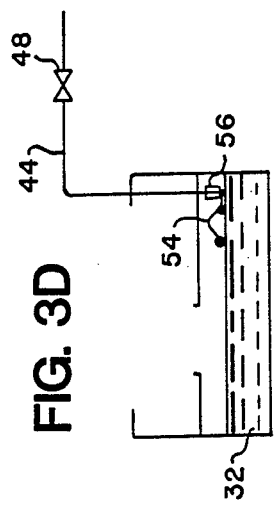
FIG. 3D is a schematic illustration of an alternative water supply arrangement for the cooler shown in FIG. 3A.
Figure 3C:
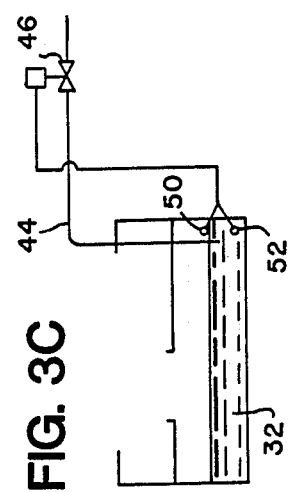
FIG. 3C is a schematic illustration of an automatically regulable water supply arrangement for the cooler shown in FIG. 3A.

Referring to FIG. 3C, there is shown a schematic illustration of a water supply arrangement for the cooler shown in FIG. 3A. A water supply line 44 defines an outlet associated with reservoir 32. A solenoid valve 46 located along supply line 44 communicates with first and second depth sensors, respectively referenced 50 and 52, mounted in reservoir 32.

When the water level in the reservoir reaches first sensor 50, a signal is sent to solenoid valve 46 to close. When, however, the water level falls below the second sensor 52, a signal is sent to solenoid valve 46 to open, thereby refilling the reservoir. Water is thus supplied to the reservoir until the water level reaches sensor 50, after which it is once again stopped.

Reference is now made to FIG. 3D, in which there is shown a schematic illustration of an alternative water supply arrangement for the cooler shown in FIG. 3A. According to the shown embodiment, a valve 48 remains open continuously. There is provided a float 54, which is attached to a valve 56 provided at the outlet of supply line 44. As the water level rises, however, to a predetermined level, float 54 also rises until eventually valve 56 is closed, thereby preventing further flow of water into reservoir 32. As the water level falls, valve 56 is reopened.

Figure 3F:
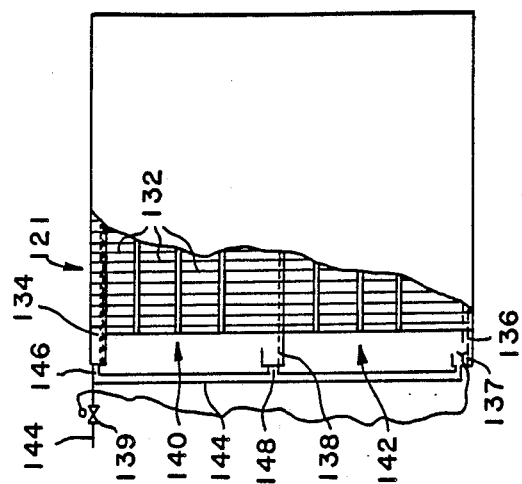
FIG. 3F is a schematic illustration of an alternative large-scale cooling element useful in the cooler of FIGS. 3A and 3B and a water supply therefor.
Figure 3E:
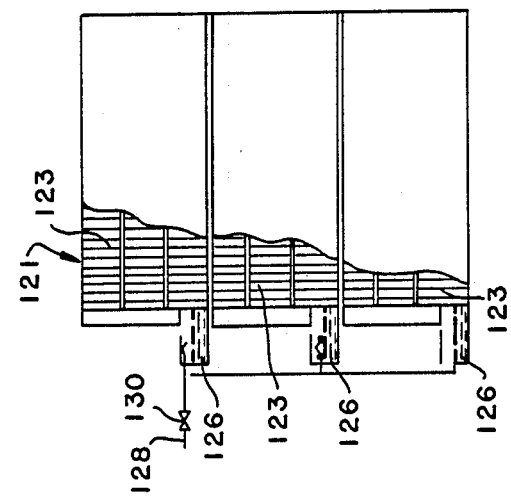
FIG. 3E is a schematic illustration of a large-scale cooling element useful in the cooler of FIGS. 3A and 3B and a water supply therefor.

Referring now to FIGS. 3E and 3F, there are shown two alternative embodiments of coolers, similar to cooler 40, but built on a much larger scale, such as may be required for industrial purposes. According to the required output, there may be provided a large-scale humidifying element, indicated generally be reference numeral 121.

Due to the increased airflow and, therefore, evaporation of water from large-scale element 121, water has to be supplied thereto at a rate that is higher than if it were immersed in a single water reservoir, as with other, smallerscale, embodiments of the invention. Accordingly, a number of water reservoirs are provided.

With particular reference to FIG. 3E, large-scale humidifying element 121 is composed of a plurality of modular elements 123. Elements 123 are stacked one above the other and each is partially immersed in a water reservoir 126. A water supply pipe 128 provides water to each of the reservoirs and includes a valve 130, which is operative to permit flow of water into the reservoirs when the level of water therein becomes depleted, in a fashion similar to that shown in FIG. 3D.

Referring now to FIG. 3F, large-scale humidifying element 121 comprises a single plurality of relatively tall, vertically arranged plates 132. There are provided top and bottom water reservoirs, referenced 134 and 136 respectively and an intermediate reservoir 138. As is shown, individual plates 132 pass through top and intermediate reservoirs, respectively, 134 and 138. Although gaps in reservoirs 134 and 138 through which plates 132 pass are sealed against leakage, water is still provided for absorption by plates 132 where applicable, on both sides of the reservoir. It is appreciated, therefore, that reservoir 134 is operative to supply water to an upper portion 140 of element 121 and reservoir 138 is operative to supply water both to upper portion 140 and to a lower portion 142 of element 121.

According to the shown embodiment, water is supplied by a supply pipe 144 to all three reservoirs, there being provided a sensor 137 to sense the level of water in reservoir 136, and which is operative to sens a signal to a valve 139 to open or close according to the sensed water level. There are also provided an overflow 146, communicating between upper reservoir 134 and intermediate reservoir 138 and an overflow 148, communicating between reservoir 138 and bottom reservoir 136.

It will be appreciated that in either of the arrangements shown in FIGS. 3E and 3F, the number of reservoirs and, in the case of FIG. 3E, the number of modular elements 123, is not limited to that shown and may be increased according to need.

Reference is now made briefly to FIGS. 4A, 4B and 4C, which show an evaporative cooler, referenced generally 60, constructed in accordance with a further embodiment of the invention. Cooler 60 is generally similar to cooler 40 shown in FIGS. 3A and 3B, with the exception that it is more compact and is, therefore, intended to be portable, serving as a personal cooler. Components similar to components shown in FIGS. 3A and 3B are, it will be appreciated, denoted by similar reference numerals and are not described at length hereinbelow.

Figure 5A:
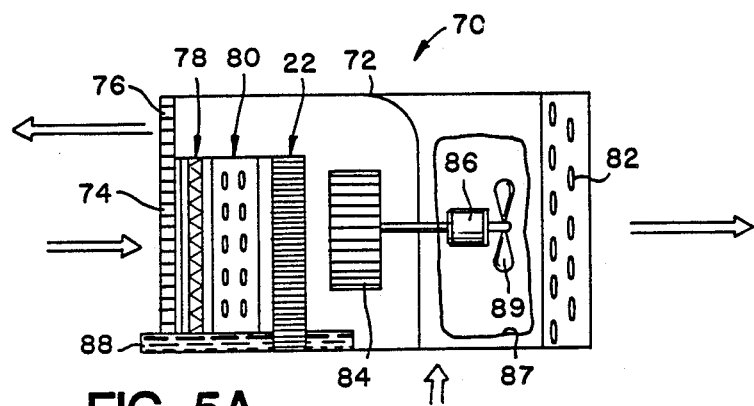
FIG. 5A is a side-sectional view of a cooling unit, constructed in accordance with an alternative embodiment of the present invention.
Figure 5B:
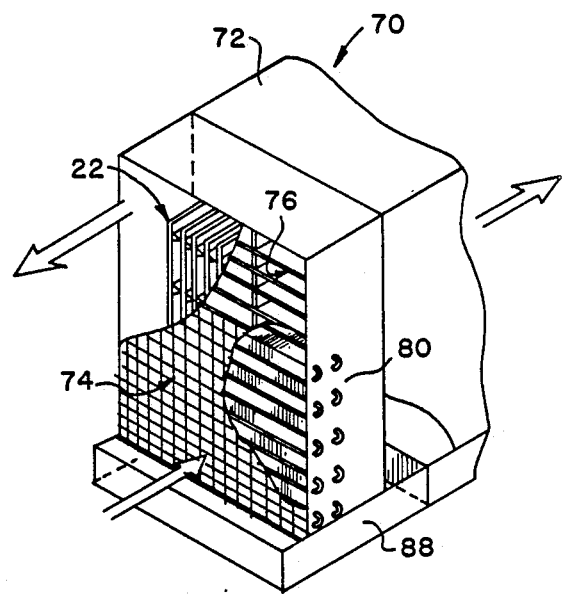
FIG. 5B is a partially cut-away, partial perspective view of a front portion of the cooling unit of FIG. 5A.

Reference is now made to FIGS. 5A and 5B, in which there is shown a cooling unit, referenced generally 70, constructed in accordance with an alternative embodiment of the present invention. Cooling unit 70 comprises a housing 72 having an air inlet 74 and an air outlet 76.

Downstream of inlet 74 there is provided a filter 78. Adjacent filter 78 and upstream of humidifying element 22 (as shown in FIG. 2 and as described above in detail in conjunction therewith) there is provided an evaporator 80, which forms part of an airconditioning unit. Evaporator 80 is operative to communicate (by means not shown) with a condenser 82. A compressor is shown at 87.

A blower 84, powered by means of a motor 86, is operative to draw air in through inlet 74. As the air is circulated across evaporator 80 and, therefore, cooled, moisture condensing on the surface of the evaporator is collected in reservoir 88. Humidifying element 22 is immersed in the water collected in reservoir 88 and, therefore, as the air, having been cooled by circulation over evaporator 80, passes through element 22 its relative humidity is substantially raised prior to being recirculated through outlet 76. A fan 89 is provided to cool condenser 82 by circulating ambient air thereacross.

Figure 6A:
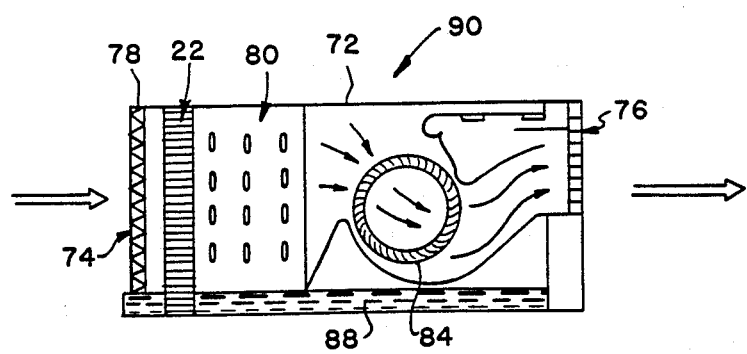
FIG. 6A is a side-sectional view of a cooling unit, constructed in accordance with an additional embodiment of the present invention.
Figure 6B:
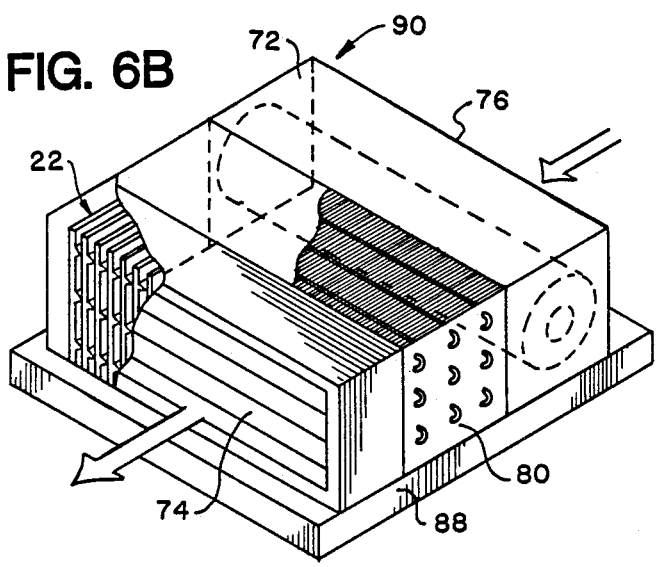
FIG. 6B is a partially cut-away, partial perspective view of a front portion of a cooling unit, constructed in accordance with an alternative embodiment of the invention.

Reference is now made to FIGS. 6A and 6B, in which there is shown a cooling unit, referenced generally 90, constructed in accordance with yet a further embodiment of the present invention. Cooling unit 90 is generally similar to cooling unit 70 shown in FIGS. 5A and 5B. Similar components are, therefore, denoted by similar reference numerals and are not described at length hereinbelow. Condenser 82, compressor 87 and fan 89 (as shown in the embodiment of FIGS. 5A and 5B) are not shown in FIGS. 6A and 6B as the cooling unit shown therein forms one portion of a portable split air conditioner, the shown portion and the portions not shown generally being located remotely from each other and connected by means of conduits.

It will be appreciated that, while the coolers shown in FIGS. 6A and 6B are generally similar, in the embodiment of FIG. 6A humidifying element 22 is situated upstream of evaporator 80. The air being circulated across the evaporator being, therefore, very moist. Although some of the moisture condenses out as the air is circulated across evaporator 80, the cool air exiting through outlet 76 nonetheless retains a sufficiently high level of humidity so as not to cause discomfort to persons in the vicinity of the cooling unit.

In the embodiment of coooler 90 shown, however, in FIG. 6B, humidifying element is situated downstream of evaporator 80.

Figure 7:
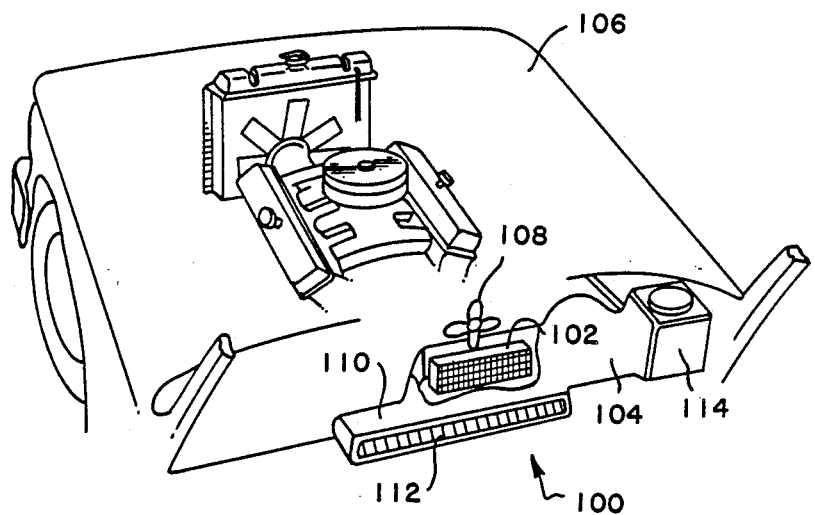
FIG. 7 is a schematic illustration of vehicle-mounted cooling apparatus, constructed and operative according to a further alternative embodiment of the invention.

Reference is now made to FIG. 7, in which there is shown a schematic illustration of vehicle-mounted cooling apparatus, referenced generally 100, constructed and operative according to a further alternative embodiment of the invention. Apparatus 100 comprises a humidifying element 102, part of which is immersed in water contained by a reservoir 104 mounted onto a vehicle 106.

According to one embodiment of the invention, a fan 108 is provided. Air is passed through element 102 and enters a housing 110 through which it exits via air ducts 112 disposed within vehicle 106.

According to an alternative embodiment of the invention, blower 108 is not provided, air flow being generated solely by the forward motion of the vehicle.

Figure 8:
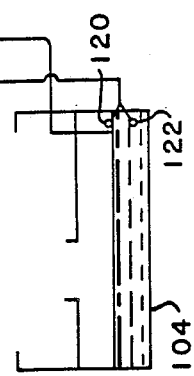
FIG. 8 is a schematic illustration of a water supply arrangement for the vehicle-mounted cooling unit shown in FIG. 7.

With additional reference to FIG. 8, there is shown a schematic illustration of a water supply arrangement for vehicle-mounted cooling unit 100. There is provided a water container 114, which may be mounted in any suitable location on vehicle 106 (FIG. 7) which allows for gravitational flow of water to reservoir 104. A water conduit 116 defines an outlet in reservoir 104. A solenoid valve 118 located along conduit 116 is associated with first and second depth sensors, respectively referenced 120 and 122 mounted in reservoir 104.

When the water level in the reservoir reaches first sensor 120, a signal is sent to solenoid valve 118 to close. When, however, the water level falls below the second sensor 122, a signal is sent to solenoid valve 118 to open, thereby refilling the reservoir. Water is thus supplied to the reservoir until the water level reaches sensor 120, after which it is once again stopped.

Figure 9:
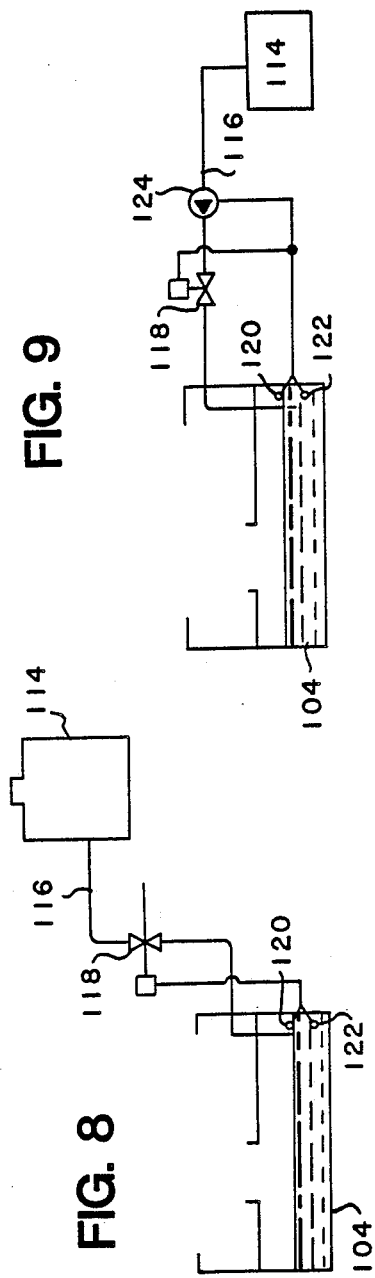
FIG. 9 is a schematic illustration of an alternative water supply arrangement for the vehicle-mounted cooling unit shown in FIG. 7.

Referring briefly to FIG. 9, there is shown a water supply arrangement for vehicle-mounted cooling unit 100 (FIG. 7) which is generally similar to the arrangement shown in FIG. 8, with the exception that a pump 124 is provided and obviates the necessity of container 114 being located such that water flows therefrom to reservoir 104 under gravity.

Figure 10:
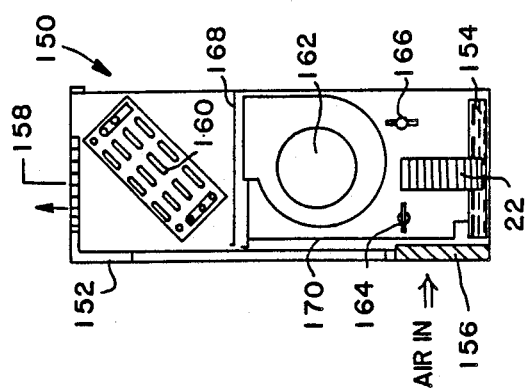
FIG. 10 shows an alternative embodiment of a cooling unit, constructed and operative in accordance with an embodiment of the invention.

Referring now to FIG. 10 there is shown a cooling unit, referenced 150, such as may be used in a computer room, wherein it is desirable to maintain a cool environment and wherein it may also be necessary to replenish moisture depleted from the environment due to the heat of the computers.

Unit 150 comprises a housing 152 in which are provided a humidifying element 22 (as shown and described in conjunction with FIG. 2) which is partially immersed in a water reservoir 154. The housing includes an air inlet 156 and outlet 158, adjacent to which is a cooling coil 160 of any suitable variety.

Air is drawn in through inlet 156 by means of a blower 162 and is operative to travel along either one of two pathways which may be opened and closed by means of valves 164 and 166. The valves are connected to a control unit (not shown) which is connected to a humidity sensor (not shown) typically located adjacent to inlet 156.

If the control unit senses, by means of the humidity sensor, that the air humidity is lower than a preselected value, as shown, valve 164 is closed and valve 166 is opened, such that air to be cooled passes through element 22 and, therefore, after having been cooled by cooling coil 160, exits through outlet 158 as cool, moist air.

Once, however, the sensed humidity level reaches a selected level, valve 166 is closed and valve 164 is opened, such that air bypasses element 22 on its way to being cooled. There is also provided a bath 168 to collect any condensed water that has formed on cooling coil 160, this water being resupplied to reservoir 154 by means of a substantially vertical conduit 170.

According to an alternative embodiment, water is also supplied to reservoir 154 by means of an external water supply arrangement, similar to that shown in either of FIGS. 3C or 3D.

It will be appreciated by persons skilled in the art that the present invention is not limited by what has been shown and described above. The scope of the invention is limited, rather, solely by the claims which follow:

I claim:
1. Cooling apparatus comprising:
at least one air humidifying element having a plurality of substantially parallel, liquid absorbent plates each having a pair of planar evaporative faces and defining a plurality of liquid pathways within said plates and defining a plurality of parallel air pathways therebetween, said plurality of air pathways intersecting and communicating with said plurality of liquid pathways, the width of each of said plurality of air pathways being defined by a plurality of ridges formed on at least one face of each of said plates forming spacer members aligned parallel to a direction of air flow, said spacer members contacting adjacent plates, said plurality of plates being spaced sufficiently close together by said spacer members such that the velocity of air entering said plurality of pathways is increased and such that the air pressure there along is decreased; and
means for applying a pressure gradient across said plurality of parallel air pathways.

2. Apparatus according to claim 1, and wherein said means for applying a pressure gradient comprises air transport means defining an inlet and an outlet.

3. Apparatus according to claim 2, and wherein said at least one air humidifying element is situated downstream of said air transport means.

4. Apparatus according to claim 3, and also including means for supplying a liquid to said at least one air humidifying element.

5. Apparatus according to 4, and wherein said means for supplying a liquid comprises at least one liquid reservoir and said at least one air humidifying element is partially immersed in said liquid.

6. Apparatus according to claim 5, and wherein said liquid is water.

7. Apparatus according to claim 5, and wherein said at least one air humidifying element comprises a plurality of air humidifying elements and said at least one liquid reservoir comprises a plurality of liquid reservoirs, each of said plurality of air humidifying elements being immersed in one of said plurality of liquid reservoirs.

8. Apparatus according to claim 5, and wherein said at least one air humidifying element comprises a single air humidifying element and said at least one liquid reservoir comprises a plurality of liquid reservoirs, said single air humidifying element passing through at least some of said plurality of liquid reservoirs so as to be in liquid absorbing contact with said liquid contained therein.

9. Apparatus according to claim 1, and also including a housing having at least one outlet port located downstream of said at least one air humidifying element.

10. Apparatus according to claim 9, and also including regulating means for lowering the relative humidity and for raising the temperature of air passing through said at least one outlet port.

11. Apparatus according to claim 10, and wherein said regulating means comprises means for supplying ambient air from said inlet directly to said at least one outlet port so as to bypass said at least one air humidifying element.

12. Apparatus according to claim 5, and wherein said air transport means and said at least one air humidifying element are located remotely from each other, there being provided a conduit for passing air between said outlet of said air transport means and said at least one air humidifying element.

13. Apparatus according to claim 9, and wherein said cooling apparatus is mounted onto a vehicle and said at least one outlet port is associated with the interior of the vehicle.

14. Apparatus according to claim 9, and also including means associated with said at least one outlet port for supplying negative ions to the air.

15. Air conditioning apparatus comprising:
a housing defining an inlet and an outlet;
means located within said housing for providing passage of air between said inlet and said outlet;
means located within said housing, upstream of said outlet, for cooling air passed between said inlet and said outlet; and
means located within said housing for raising the relative humidity of the air passed between said inlet and said outlet having at least one air humidifying element having a plurality of substantially parallel, water absorbent plates each having a pair of planar evaporative faces and defining a plurality of liquid pathways within said plates and defining a plurality of parallel air pathways therebetween, said plurality of parallel air pathways intersecting and communicating with said plurality of liquid pathways, the width of each of said plurality of air pathways being defined by a plurality of ridges formed on at least one said face of each of said plates forming spacer members aligned parallel to a direction of air flow, each said plurality of spacer members on each said plate which has a neighboring plate adjacent said plurality of spacer members being in contact with said adjacent plate, and said plurality of plates being spaced sufficiently close together by said spacer members such that the velocity of air entering said plurality of pathways is increased and such the air pressure there along is decreased.

16. Apparatus according to claim 15, and also including means for supplying water to said air humidifying element.

17. Apparatus according to claim 16, and wherein said means for supplying water comprises at least one reservoir for water and said air humidifying element is partially immersed in the water.

18. Apparatus according to claim 17, and wherein said at least one air humidifying element comprises a plurality of air humidifying elements and said at least one reservoir comprises a plurality of reservoirs, each of said plurality of air humidifying elements being immersed in one of said plurality of reservoirs.

19. Apparatus according to claim 17, and wherein said at least one air humidifying element comprises a single air humidifying element and said at least one reservoir comprises a plurality of reservoirs, said single air humidifying element passing through at least some of said plurality of reservoirs so as to be in water absorbing contact with said water contained therein.

20. Apparatus according to claim 17, and wherein said means for cooling air passed between said inlet and said outlet comprises means for evaporating a liquefied gas, said water reservoir being at least partially supplied by condensed water formed on said means for evaporating.

21. Apparatus according to claim 17, and wherein said air humidifying element is situated upstream of said means for evaporating.

22. Apparatus according to claim 17, and wherein said air humidifying element is situated downstream of said means for evaporating.

* * * * *